United States Patent [19]
Maruyama

[11] Patent Number: 6,151,371
[45] Date of Patent: Nov. 21, 2000

[54] AUTOMATIC FREQUENCY CONTROL CIRCUIT

[75] Inventor: Hidenori Maruyama, Tokyo, Japan

[73] Assignee: NEC Corporation, Japan

[21] Appl. No.: 08/976,777

[22] Filed: Nov. 24, 1997

[30] Foreign Application Priority Data

Nov. 27, 1996 [JP] Japan ..................................... 8-315904

[51] Int. Cl.[7] ................................................ H04L 27/06
[52] U.S. Cl. ....................................... 375/344; 455/192.2
[58] Field of Search .................................... 375/344, 336; 348/735; 455/182.2, 192.2

[56] References Cited

U.S. PATENT DOCUMENTS

| 5,400,366 | 3/1995 | Iwamatsu | 375/344 |
| 5,579,346 | 11/1996 | Kanzaki | 375/344 |
| 5,696,797 | 12/1997 | Bucher et al. | 375/344 |

Primary Examiner—Temesghen Ghebretinsae
Attorney, Agent, or Firm—Ostrolenk, Faber, Gerb & Soffen, LLP

[57] ABSTRACT

Disclosed is an automatic frequency control circuit for correcting the influence of frequency offset in a radio data communication terminal of a scheme in which transmission path characteristics are obtained during the preamble period by narrow-band modulation to equalize the received signal. The automatic frequency control circuit includes, on the transmitter side, a unit for repeatedly transmitting the pattern of a predetermined pseudo noise (PN) signal serving as a preamble signal, on the receiver side, a unit for calculating the phase difference per PN cycle on the basis of the component (real and imaginary part amplitude values) of a PN signal one cycle before that is quadrature-modulated during a predetermined period of the preamble, and the component of a current PN signal, a unit for dividing the phase difference by the number of symbols of one PN cycle to obtain the phase difference ($\Delta\theta$) of the unit symbol, a unit for holding $\Delta\theta$ during the burst period, a unit for integrating $\Delta\theta$ in units of symbols during data demodulation, a unit for converting the integrated value into real and imaginary part amplitude values, and a unit for correcting the phase of the demodulated received signal on the basis of the obtained real and imaginary part amplitude values.

2 Claims, 4 Drawing Sheets

AUTOMATIC FREQUENCY CONTROL CIRCUIT

BACKGROUND OF THE INVENTION

1. Field of the Invention

The present invention relates to an automatic frequency control circuit and, more particularly, to an automatic frequency control circuit for correcting the influence of frequency offset in a radio data communication terminal in a scheme in which transmission path characteristics are obtained during the preamble period by narrow-band modulation such as GMSK to equalize the received signal.

2. Description of the Prior Art

In many cases, a synthesizer, a quartz oscillator, or the like having high oscillation precision cannot be used to generate a radio frequency due to limitations on cost, size, and the like. In general, therefore, a radio unit performs automatic frequency control, and communication is performed while controlling any frequency offset between the transmission side and the reception side.

FIG. 1 shows an example of a conventional automatic frequency circuit of an FM receiver.

The FM receiver comprises an antenna 41 for receiving a radio wave transmitted from the transmitter side, a bandpass filter 42 for extracting a signal having a necessary band from the received signal, an amplifier 43 for amplifying the level of the signal passing through the bandpass filter 2 to a necessary level, a mixer 44 for decreasing the frequency of the received signal to a necessary frequency, an oscillator 45 for generating a necessary frequency, an amplifier 46 for amplifying the level of the received signal to a necessary level, a limiter 47 for limiting the amplitude of the received signal, and a frequency discriminator 48 for demodulating the received signal.

After a signal received by the antenna 41 is amplified by the amplifier 43, it is changed by the mixer 44 to a signal having a necessary frequency, amplified by the amplifier 46, limited in amplitude by the limiter 47, and demodulated by the frequency discriminator 48. The DC component of the demodulated data changes its polarity to positive or negative depending on the offset direction of the center frequency from the center of the S-mode characteristic of the discriminator. This DC component is negatively fed back to control the frequency of the oscillator.

In the prior art, an error undesirably occurs in frequency control because the frequency spectrum changes or becomes asymmetrical in the frequency selection multi-path fading environment.

SUMMARY OF THE INVENTION

The present invention has been made in consideration of the above situation, and has as its object to enable correction of the influence of frequency offset even in the frequency selection multi-path fading environment in a radio data communication terminal of a scheme in which transmission path characteristics are obtained during the preamble period by narrow-band modulation to equalize the received signal.

To achieve the above object, according to the first aspect of the present invention, there is provided an automatic frequency control circuit for correcting influence of a frequency offset of a radio data communication terminal of a scheme in which a transmission path characteristic is obtained during a preamble period by narrow-band modulation to equalize a received signal, comprising on a transmitter side, means for repeatedly transmitting a pattern of a predetermined pseudo noise (PN) signal serving as a preamble signal; on a receiver side, means for calculating a phase difference per PN cycle on the basis of a component (real and imaginary part amplitude values) of a PN signal one cycle before that is quadrature-modulated during a predetermined period of the preamble, and a component of a current PN signal; means for dividing the phase difference by the number of symbols of one PN cycle to obtain a phase difference ($\Delta\theta$) of a unit symbol; means for holding $\Delta\theta$ during a burst period; means for integrating $\Delta\theta$ in units of symbols during data demodulation; means for converting an integrated value into real and imaginary part amplitude values; and means for correcting a phase of a demodulated received signal on the basis of the obtained real and imaginary part amplitude values.

According to the second aspect of the present invention, there is provided an automatic frequency control circuit wherein, when a signal component has a level not more than a predetermined level, the means, defined in the first aspect, of calculating the phase difference per symbol on the basis of the component (real and imaginary part amplitude values) of the PN signal one cycle before that is quadrature-modulated during the predetermined period of the preamble, and the component of the current PN signal does not integrate the value.

As is apparent from the above aspects, in automatic frequency control using the PN signal of the present invention, phase correction can be done in units of symbols during data demodulation by repeatedly transmitting the pattern of a predetermined PN signal serving as a preamble pattern from the transmitter side, and calculating the phase difference per PN cycle on the basis of the component of a PN signal one cycle before that is quadrature-modulated during a preamble period, and the component of the current PN signal on the receiver side. Therefore, automatic frequency control can be attained even in the frequency selection multi-path fading environment.

In this manner, according to the present invention, phase correction can be done in units of symbols even in the frequency selection multi-path fading environment in automatic frequency control of correcting the influence of frequency offset in a radio data communication terminal of a scheme in which transmission path characteristics are obtained during the preamble period by narrow-band modulation to equalize the received signal. Accordingly, high-speed data communication can be realized even with a low-precision synthesizer, oscillator, or the like, and the apparatus can be downsized.

The above and many other objects, features and advantages of the present invention will become manifest to those skilled in the art upon making reference to the following detailed description and accompanying drawings in which a preferred embodiment incorporating the principle of the present invention is shown by way of illustrative example.

DETAILED DESCRIPTION OF PREFERRED EMBODIMENTS

1. Description of Arrangement

An embodiment of the present invention will be described in detail below with reference to the accompanying drawings.

Figure 1:
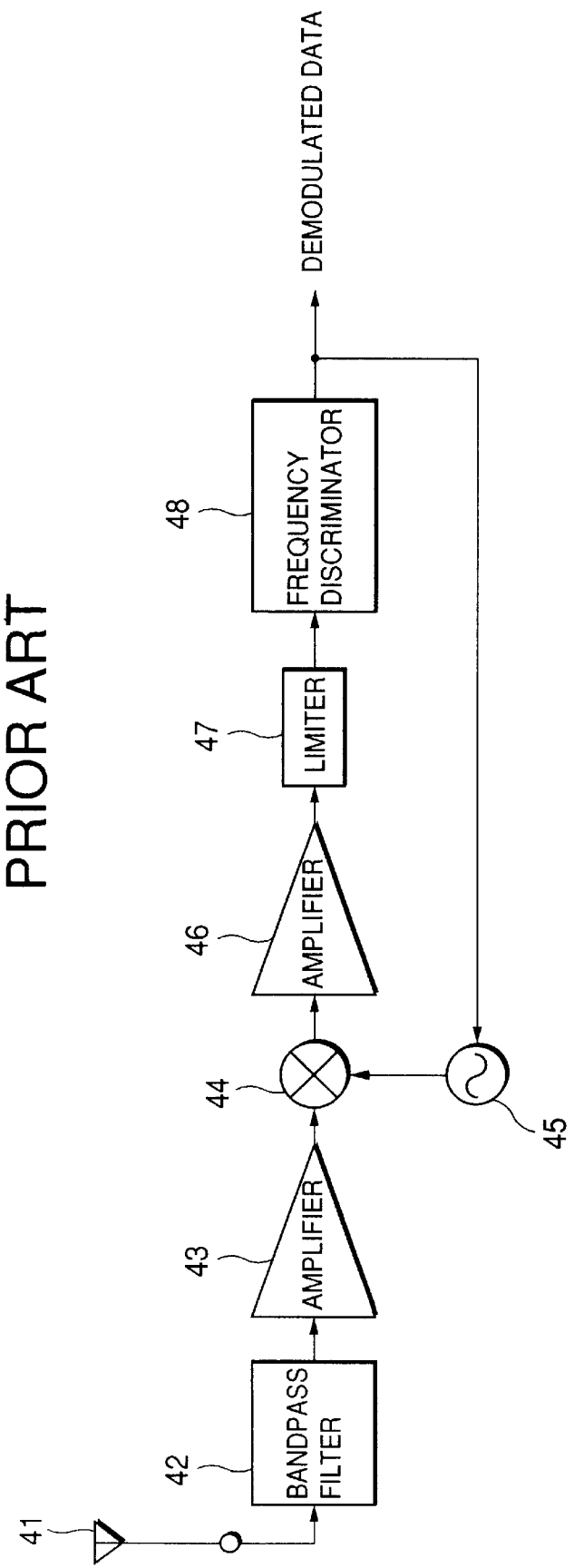
FIG. 1 is a block diagram showing the arrangement of a conventional automatic frequency control circuit.
Figure 2:
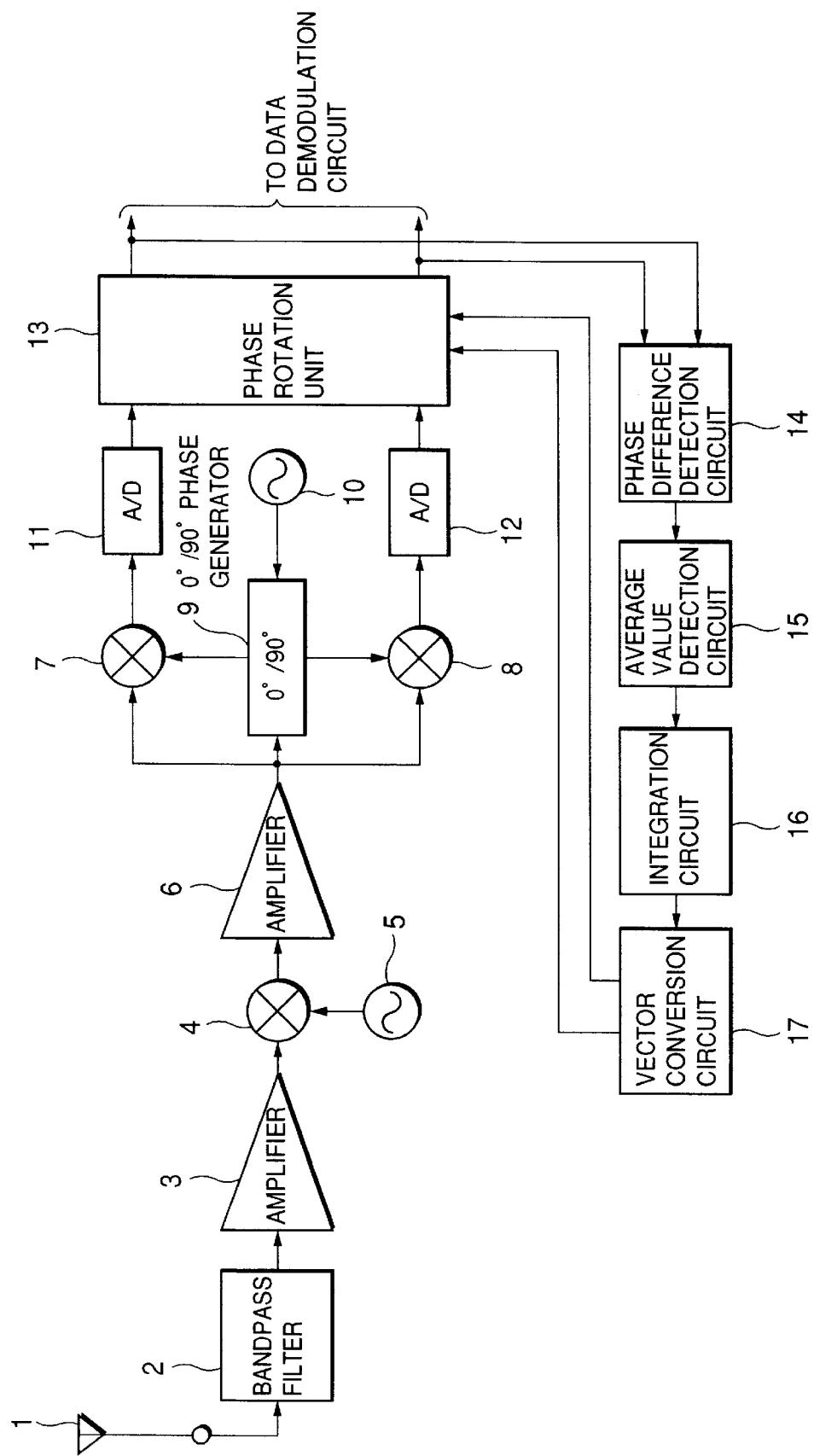
FIG. 2 is a block diagram showing the whole arrangement of an embodiment of the present invention.

FIG. 2 shows an example of the arrangement of automatic frequency control using a PN signal according to the present invention. In FIG. 2, a receiver comprises an antenna 1 for receiving a radio wave transmitted from the transmitter side (not shown), a bandpass filter 2 for extracting a signal having a necessary band from the received signal, an amplifier 3 for amplifying the level of the signal passing through the bandpass filter 2 to a necessary level, a mixer 4 for decreasing the frequency of the received signal to a necessary frequency, an oscillator 5 for generating a necessary frequency, an amplifier 6 for amplifying the level of the received signal to a necessary level, mixers 7 and 8, a 0°/90° phase generator 9, and an oscillator 10 which are used to quadrature-modulate the received signal, A/D converters 11 and 12 for A/D-converting the signals of quadrature-modulated real and imaginary part amplitude values, a phase rotation unit 13 for rotating the phase of the received signal by a necessary phase amount, a phase difference detection circuit 14 for obtaining the current angle and an angle after one cycle, and calculating the difference between these angles, an average value detection circuit 15 for integrating the angle value calculated by the phase difference detection circuit 14 a predetermined number of times, and calculating the average value, an integration circuit 16 for integrating the value calculated by the average value detection circuit 15 in units of symbols, and a vector conversion circuit 17 for converting a signal output from the integration circuit 16 into a real part amplitude value and an imaginary part amplitude value.

2. Description of Operation

Figure 3:
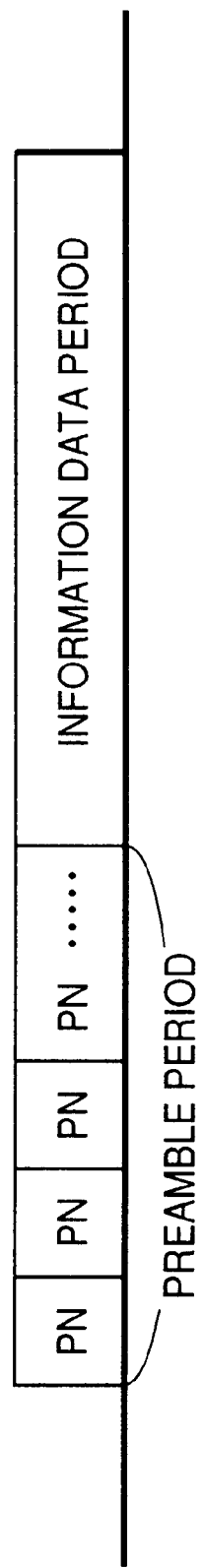
FIG. 3 is a view showing the signal format of the transmission frame in the embodiment of the present invention.

FIG. 3 shows a transmission frame format in the embodiment of the present invention. This format is constituted by a preamble period in which frame synchronization detection or the like is performed, and an information data period. In this embodiment, the same PN signal pattern is repeatedly transmitted during the preamble period. In a required period of this preamble, a phase difference between samples separated by one PN cycle is divided by the number of symbols of one PN cycle to obtain the phase difference Δθ of the unit symbol, this value is held during one burst, and the value Δθ is integrated in units of symbols to correct the phase of the incoming signal on the reception side.

This will be explained in more detail below.

The receiver side receives a transmitted signal through the antenna 1. The phase difference detection circuit 14 obtains the current angle by using quadrature-modulated output signals from the A/D converters 11 and 12, and real and imaginary part amplitude values with reference to a table. The phase difference detection circuit 14 calculates the difference between the current angle and the angle obtained from the received signal one PN cycle before. This operation is repeatedly executed to input a predetermined number of differences to the average value detection circuit 15, and calculate the average value, which is performed for smoothing. The average value obtained, Δθ, is fixed during the burst period. The integration circuit 16 integrates Δθ in units of symbols. The vector conversion circuit 17 converts the integrated value into a real part amplitude value and an imaginary part amplitude value, which are input to the phase rotation unit 13, and synthesized with the received signal to correct its phase.

The phase rotation unit 13, the phase difference detection circuit 14, the average value detection circuit 15, the integration circuit 16, and the vector conversion circuit 17 shown in FIG. 2 will be described in detail with reference to FIG. 4.

The phase rotation unit 13 is built from multipliers 21, 22, 23, and 24, and adders 25 and 26. The phase difference detection circuit 14 is made up of an absolute value detection circuit 27, a comparison circuit 28, an angle detection unit 29, a delay circuit 30, a subtracter 31, and a signal switching circuit 32. The average value detection circuit 15 has an adder 33, a latch circuit 34, a divider 35, and a latch circuit 36, and the integration circuit 16 an adder 37 and a latch circuit 38. The vector conversion circuit 17 is constituted by a real part amplitude value detection circuit 39 and an imaginary part amplitude value detection circuit 40.

Figure 4:
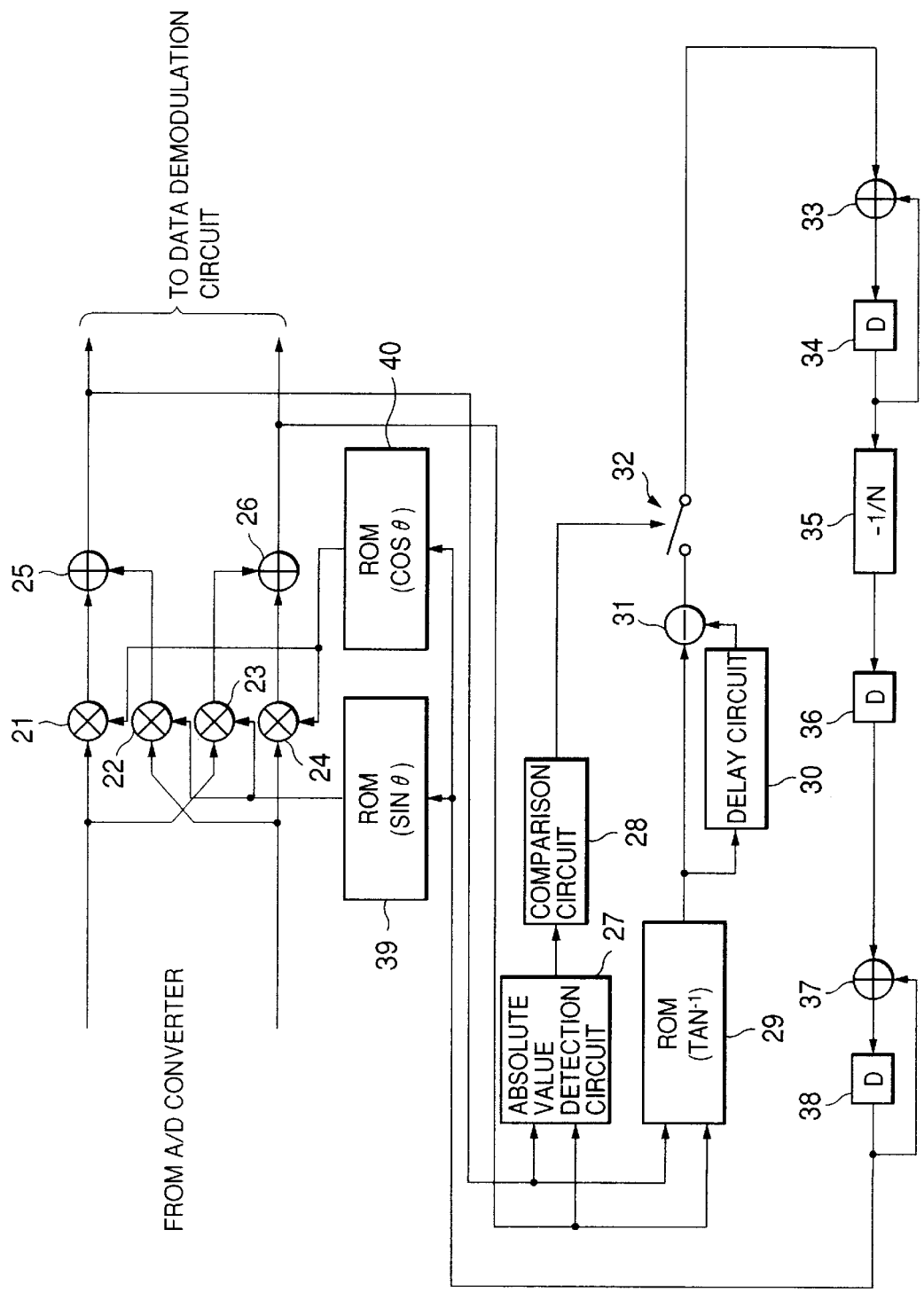
FIG. 4 is a block diagram showing a phase rotation unit, a phase difference detection circuit, an average value detection circuit, an integration circuit, and a vector conversion circuit shown in FIG. 2 in detail.

As is apparent from FIG. 4, the phase rotation unit 13 rotates the phase of the incoming signal by a necessary phase amount in combination with the multipliers 21, 22, 23, and 24 and the adders 25 and 26 in accordance with the addition theorem, thereby controlling the frequency of the signal.

The absolute value detection circuit 27 inputs the amplitude values of the real and imaginary parts to the angle detection unit 29 to obtain an angle, and inputs the obtained value to the delay circuit 30 to delay the value by one cycle. The subtracter 31 calculates the difference between the angle value delayed by one cycle and the current angle value. At this time, when a signal of low level due to noise or the like is input, a correct phase difference cannot be calculated. For this reason, the absolute value detection circuit 27 calculates the absolute values of the amplitude values of the real and imaginary parts, and when the comparison circuit 28 determines that the signal level is equal to or lower than a predetermined level, the signal switching circuit 32 cancels the signal.

In the average value detection circuit 15, the adder 33 adds a predetermined number of phase difference values, and the latch circuit 34 latches the added value. The divider 35 divides the latched value to obtain the average value, and the latch circuit 36 latches and holds the average value.

The integration circuit 16 integrates the average value with the adder 37 and the latch circuit 38 to output a phase value.

In the vector conversion circuit 17, the phase value is input to the real part amplitude value detection circuit 39 and the imaginary part amplitude value detection circuit 40 to obtain the amplitude values of the real and imaginary parts, which are input to the phase rotation unit 13 to rotate the phase by a necessary phase amount and correct the phase.

What is claimed is:

1. An automatic frequency control circuit for correcting influence of a frequency offset of a radio data communication terminal of a scheme in which a transmission path characteristic is obtained during a preamble period by narrow-band modulation to equalize a received signal, comprising:

on a transmitter side, means for repeatedly transmitting a pattern of a predetermined pseudo noise (PN) signal serving as a preamble signal; on a receiver side, means for calculating a phase difference for a cycle of said PN signed on the basis of a component (real and imaginary part amplitude values) of a PN signal one cycle before that is quadrature-modulated during a predetermined period of the preamble, and a component of a current PN signal; means for dividing the phase difference by the number of PN symbols of one PN cycle of a PN signed to obtain a phase difference ($\Delta\theta$) of a unit symbol; means for holding $\Delta\theta$ during a burst period; means for integrating $\Delta\theta$ in units of symbols during data demodulation; means for converting an integrated value into real and imaginary part amplitude values; and means for correcting a phase of a demodulated received signal on the basis of the obtained real and imaginary part amplitude values.

2. A circuit according to claim 1, wherein, when a signal component has a level not more than a predetermined level, said means of calculating the phase difference per PN cycle on the basis of the component (real and imaginary part amplitude values) of the PN signal one cycle before that is quadrature-modulated during the predetermined period of the preamble, and the component of the current PN signal does not integrate the value.

* * * * *